(12) United States Patent
Ichio et al.

(10) Patent No.: US 8,152,550 B2
(45) Date of Patent: Apr. 10, 2012

(54) VEHICLE CHARGING CONNECTOR

(75) Inventors: Toshifumi Ichio, Yokkaichi (JP);
Akinori Takada, Yokkaichi (JP);
Shuichi Nagata, Toyota (JP)

(73) Assignees: Sumitomo Wiring Systems, Ltd. (JP);
Toyoto Jidosha Kabushiki Kaisha (JP)

( * ) Notice: Subject to any disclaimer, the term of this patent is extended or adjusted under 35 U.S.C. 154(b) by 0 days.

(21) Appl. No.: 13/179,632

(22) Filed: Jul. 11, 2011

(65) Prior Publication Data

US 2012/0064755 A1 Mar. 15, 2012

(30) Foreign Application Priority Data

Sep. 9, 2010 (JP) ................................. 2010-202236

(51) Int. Cl.
*H01R 13/62* (2006.01)

(52) U.S. Cl. ........................................................ 439/304

(58) Field of Classification Search .................. 439/304, 439/305, 372, 310
See application file for complete search history.

(56) References Cited

U.S. PATENT DOCUMENTS

| | | | | |
|---|---|---|---|---|
| 5,984,706 A | * | 11/1999 | Kakuta et al. | 439/310 |
| 6,123,569 A | * | 9/2000 | Fukushima et al. | 439/456 |
| 6,602,090 B2 | * | 8/2003 | Kato | 439/455 |
| 8,016,604 B2 | * | 9/2011 | Matsumoto et al. | 439/304 |
| 2011/0034053 A1 | * | 2/2011 | Matsumoto et al. | 439/304 |
| 2011/0037053 A1 | | 2/2011 | Hikmet et al. | |
| 2011/0212645 A1 | | 9/2011 | Osawa et al. | |

FOREIGN PATENT DOCUMENTS

JP 2010-123521 6/2010
JP 2010182461 8/2010

* cited by examiner

*Primary Examiner* — Tulsidas C Patel
*Assistant Examiner* — Phuongchi Nguyen
(74) *Attorney, Agent, or Firm* — Gerald E. Hespos; Michael J. Porco

(57) ABSTRACT

A vehicle charging connector is configured to be coupled to a vehicle-side connector to charge a vehicle battery via the vehicle-side connector. The vehicle charging connector includes a housing, a coupling portion provided on a housing, and a lever. The lever has a lever bar accommodated in the housing, a lock portion provided on one end of the lever bar and configured to engage with a lock receiving portion of the vehicle-side connector to maintain the coupling portion and the vehicle-side connector in a coupled condition, and an unlock operation portion provided on the other end of the lever bar and operable to release an engagement between the lock portion and the lock receiving portion. An upper surface of the lever bar includes a water guide adjacent to the lock portion. The water guide includes a slope surface having a downward inclination.

9 Claims, 17 Drawing Sheets

US 8,152,550 B2

VEHICLE CHARGING CONNECTOR

CROSS-REFERENCE TO RELATED APPLICATION(S)

The present application claims the benefit of priority of Japanese Patent Application No. 2010-202236 filed on Sep. 9, 2010, the disclosure of which is incorporated herein by reference.

BACKGROUND OF THE INVENTION

1. Field of the Invention

The present disclosure relates to a vehicle charging connector adapted to be coupled to a vehicle-side connector to charge a vehicle battery.

2. Description of the Related Art

A related art vehicle charging connector has a housing and a coupling portion arranged at a front opening of the housing. The coupling portion is adapted to be coupled to a vehicle-side connector. Inside the housing, a lever is arranged to extend in a front-rear direction of the charging connector. The lever has a lever bar, a lock portion disposed on the front end of the lever bar, and an unlock operation portion disposed on the rear end of the lever bar. The vehicle-side connector has a lock receiving portion engageable with the lock portion of the lever.

When charging the vehicle battery, the charging connector is coupled to the vehicle-side connector such that the lock portion and the lock receiving portion engage with each other, whereby the charging connector and the vehicle-side connector are maintained in a firmly fitted condition. When the charging is finished, the unlock operation portion is pressed to release the lock portion from the lock receiving portion, so that the charging connector can be decoupled from the vehicle-side connector (see, e.g., JP 2010-123521 A).

However, when the charging connector is, for example, used outdoors and exposed to cold temperature, water may enter the housing and freeze on an upper surface of the lever bar, and the resulting ice on the lever bar may grow due to subsequent waterdrops adhering to the ice, in which case the ice may interfere with the unlock operation of the lever, for example, by hitting an inner wall of the housing. Further, to remove the ice, the housing may need to be disassembled.

SUMMARY OF THE INVENTION

Illustrative aspects of the present invention have been made with a view to preventing a lock or unlock operation of a vehicle charging connector from being obstructed by ice.

An illustrative aspect of the present invention provides a vehicle charging connector configured to be coupled to a vehicle-side connector to charge a vehicle battery via the vehicle-side connector. The vehicle charging connector includes a housing, a coupling portion provided on the housing and configured to be coupled to the vehicle-side connector, and a lever. The lever has a lever bar accommodated in the housing, a lock portion provided on one end of the lever bar and configured to engage with a lock receiving portion of the vehicle-side connector to maintain the coupling portion and the vehicle-side connector in a coupled condition, and an unlock operation portion provided on the other end of the lever bar and operable to release an engagement between the lock portion and the lock receiving portion. An upper surface of the lever bar includes a water guide adjacent to the lock portion. The water guide includes a slope surface having a downward inclination.

Other aspects and advantages of the present invention will be apparent from the following description, the drawings and the claims.

DETAILED DESCRIPTION OF THE PREFERRED EMBODIMENTS

Hereinafter, exemplary embodiments of the present invention will be described with reference to the drawings.

Figure 1:
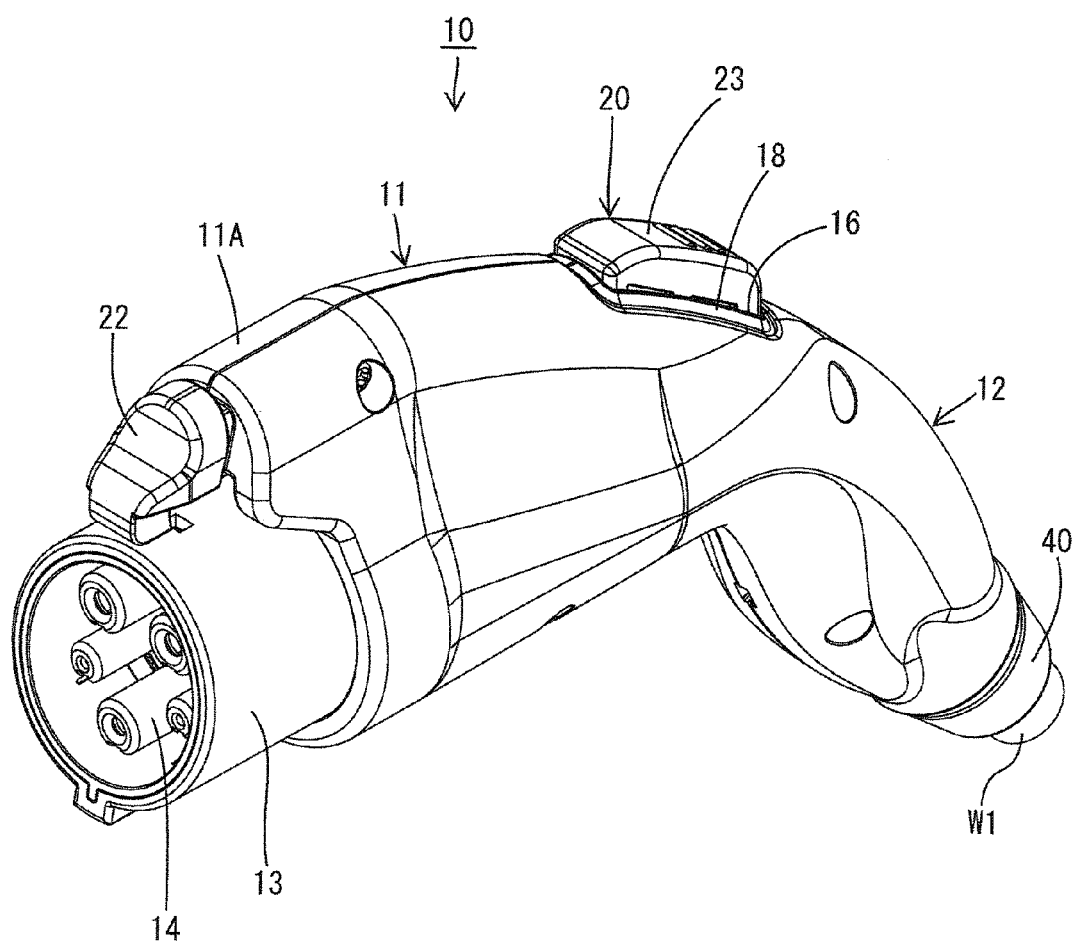
FIG. 1 is a front perspective view of a vehicle charging connector according to an exemplary embodiment of the present invention.
Figure 4:
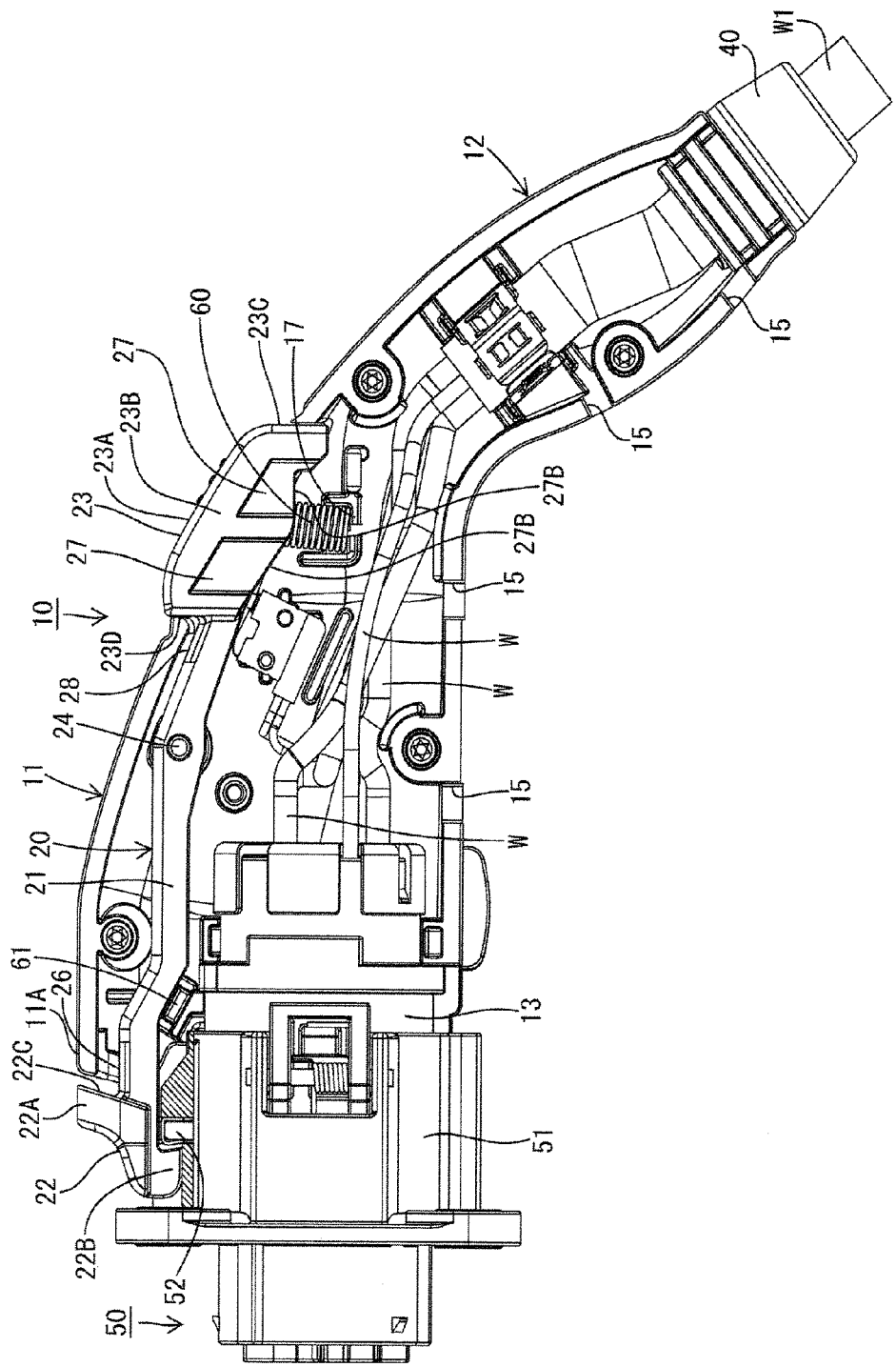
FIG. 4 is a partial sectional view of FIG. 2, illustrating an internal structure of the charging connector.
Figure 5:
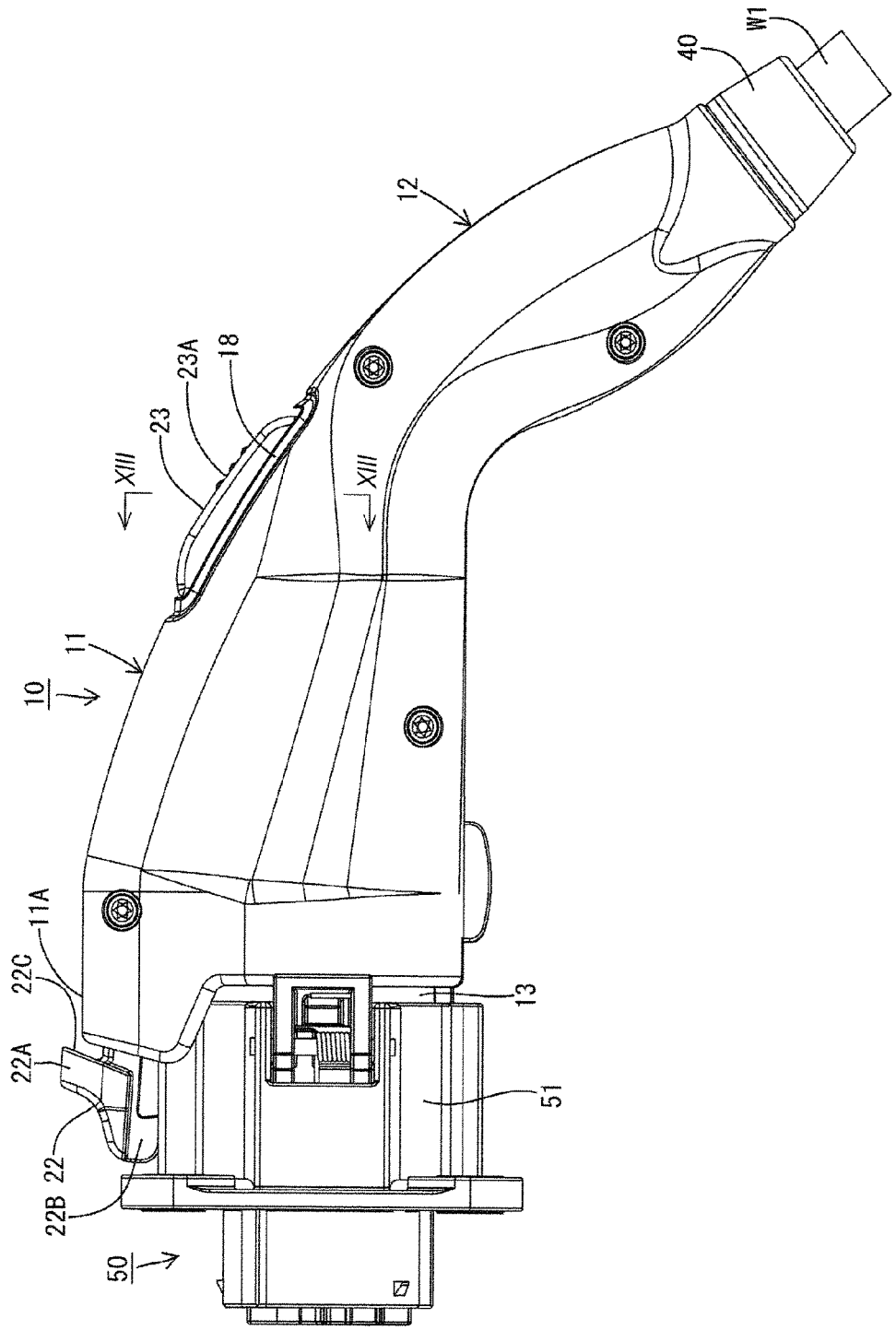
FIG. 5 is another side view of the charging connector with an unlock operation portion being pressed.

According to an exemplary embodiment of the present invention, a vehicle charging connector 10 has a shape like a handgun as a whole. As shown in FIG. 1, the charging connector 10 includes a connector main body 11 forming about a front half of the charging connector 10 and a grip 12 extending obliquely downward from a rear end of the connector main body 11. The connector main body 11 and the grip 12 are made of a synthetic resin as a one-piece structure to form a housing. A cylindrical coupling portion 13 is arranged to protrude forward from a front end of the connector main body 11. Inside the connector main body 11, as shown in FIG. 4, a lever bar 21 of a lever 20 is accommodated.

The coupling portion 13 is formed as a separate member from the connector main body 11, and is fixed to the front end of the connector main body 11. Inside the coupling portion 13, a plurality of cylindrical terminal covers 14 are provided. The terminal covers 14 are provided to protrude forward from a base wall of the coupling portion 13. Each of the terminal covers 14 is formed with a cavity to accommodate an associated terminal fitting therein.

A plurality of electric wires W extends from a rear side of coupling portion 13. The wires W are arranged to extend through the connector main body 11 to the inside of the grip 12 where the wires W are bundled by a sheath to form a single cable W1. The cable W1 is fixed inside of the grip 12 by a wire holding ring or the like, and is also fixed at a rear end of the grip 12 by a bush 40.

The bush 40 is tightly attached to an inner circumferential surface of a rear opening portion of the grip 12 and to an outer circumferential surface of the cable W1, so as to prevent water from entering into the grip 12 from the rear end of the grip 12. Further, drain holes 15 are formed though the bottom walls of the connector main body 11 and the grip 12. Therefore, even when water enters into the connector main body 11 or the grip 12, it is possible to drain the water to the outside from the drain holes 15.

Figure 14:
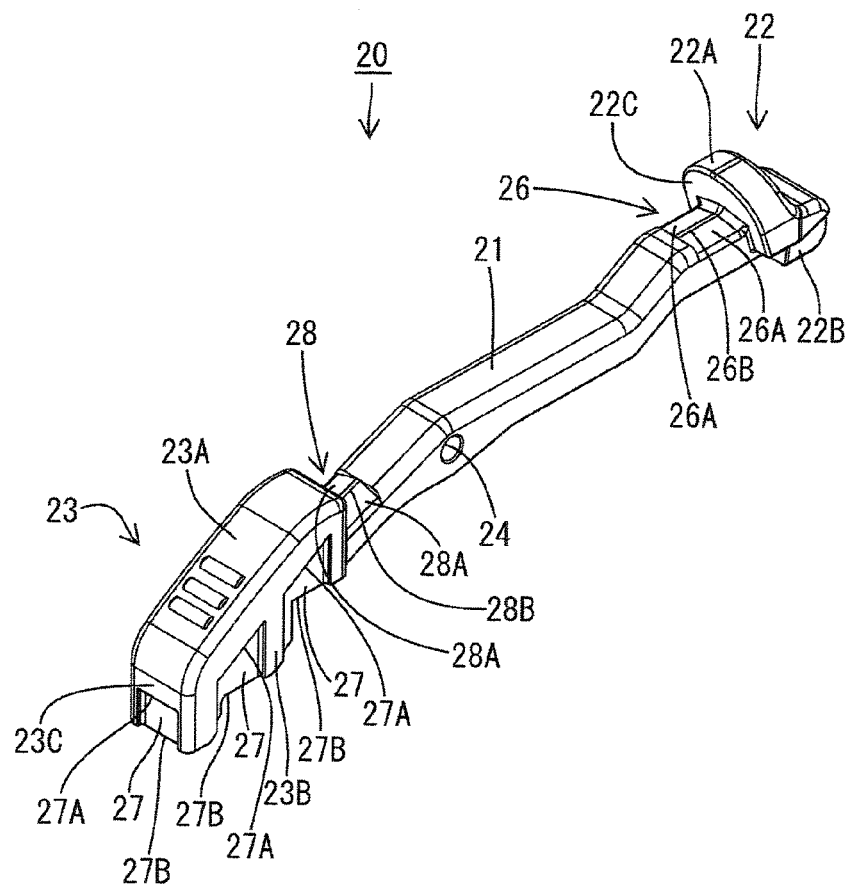
FIG. 14 is a rear perspective view of a lever of the charging connector.
Figure 15:
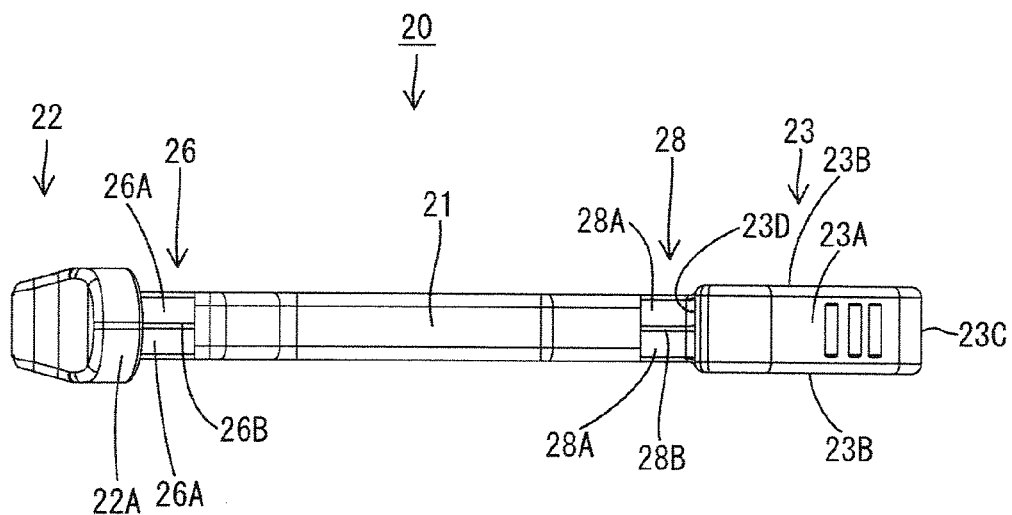
FIG. 15 is a top view of the lever.

As shown in FIG. 14, the lever 20 includes a lever bar 21 extending in a front-rear direction of the charging connector 10, a lock portion 22 disposed on the front end of the lever bar 21, and an unlock operation portion 23 disposed on the rear end of the lever bar 21. At an approximately center portion of the lever bar 21 in the front-rear direction, a pivot 24 is provided. The pivot 24 is rotatably supported inside the connector main body 11 so that the front and rear end portions of the lever bar 21 can tilt on the pivot 24 like a seesaw.

Figure 16:
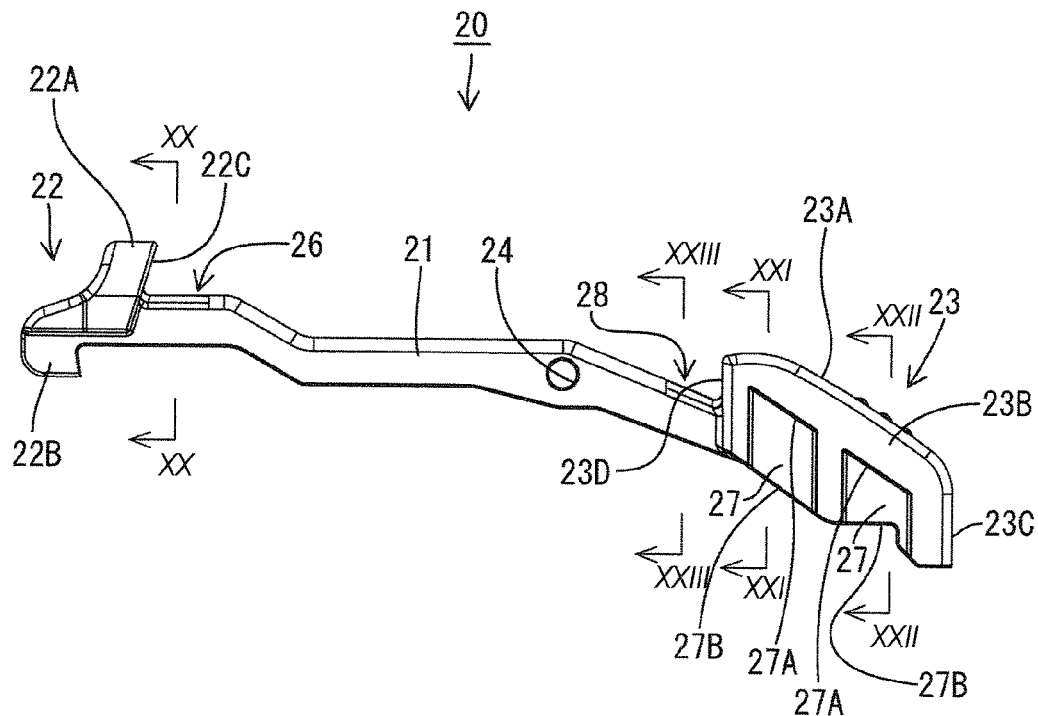
FIG. 16 is a side view of the lever.

As shown in FIG. 16, toward the front from the pivot 24, the lever bar 21 extends horizontally, then extends slightly obliquely upward, and extends horizontally again. On the other side, toward the rear from the pivot 24, the lever bar 21 extends obliquely downward. Therefore, the lock portion 22 is disposed at an upper position than the unlock operation portion 23.

Figure 7:
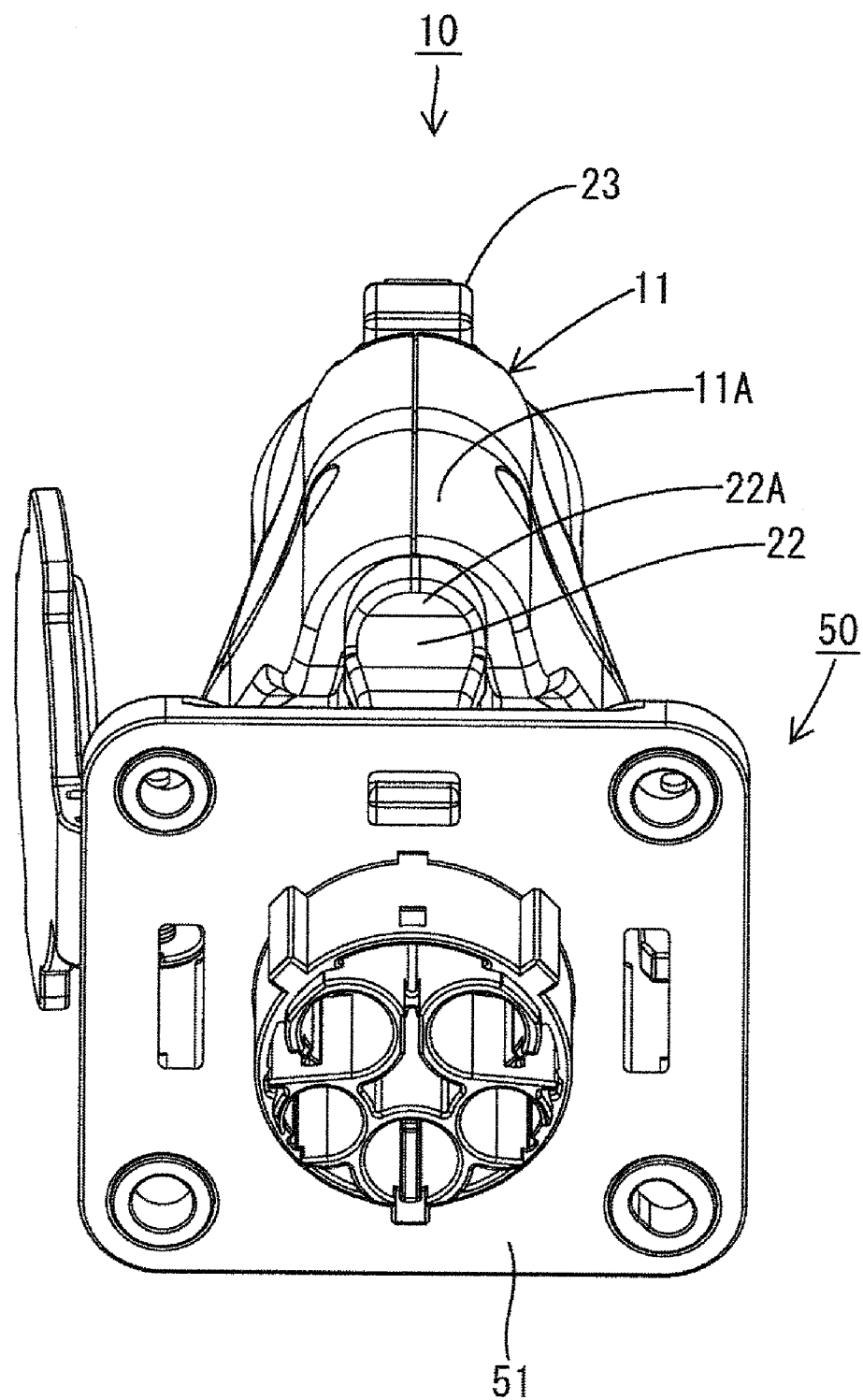
FIG. 7 is a front view of the charging connector coupled to the vehicle-side connector.
Figure 8:
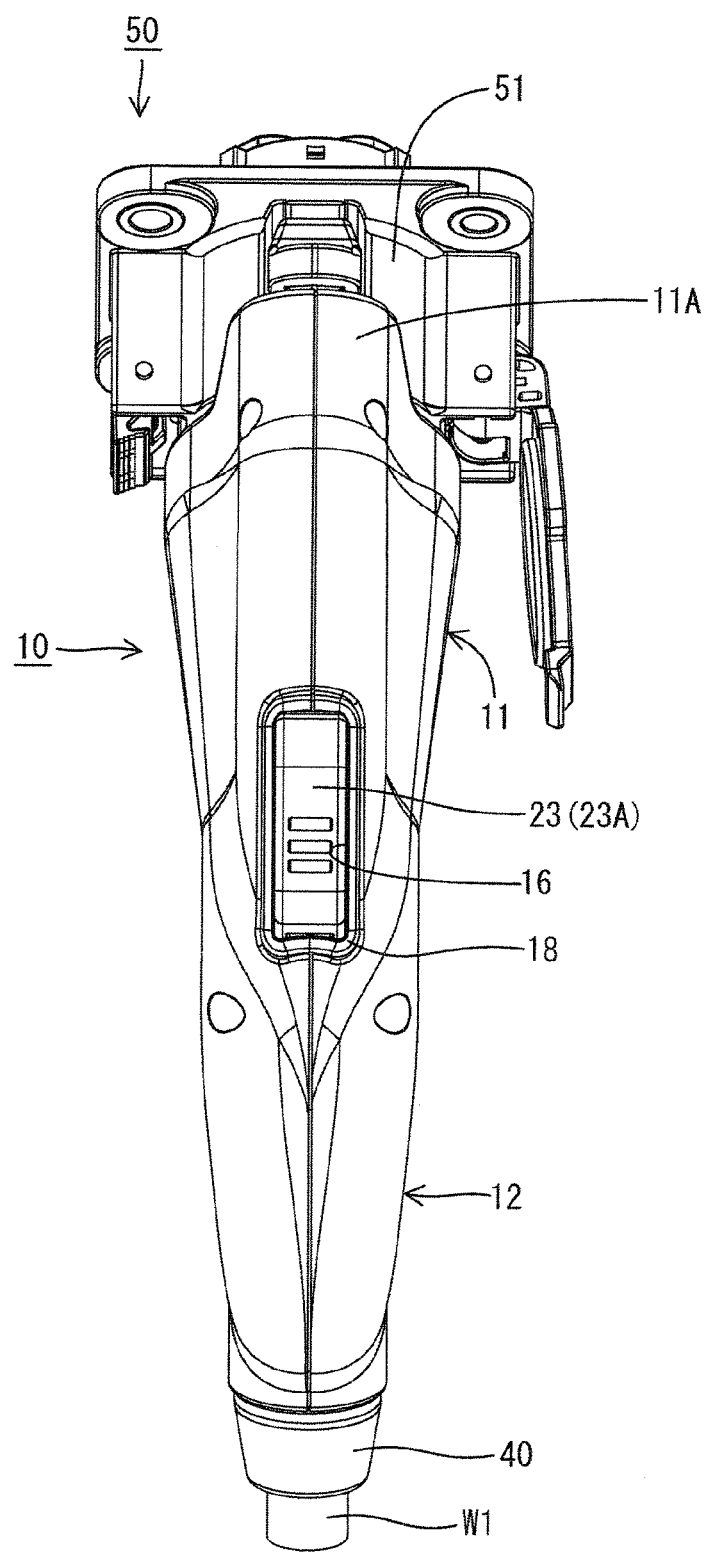
FIG. 8 is a top view of the charging connector coupled to the vehicle-side connector.
Figure 9:
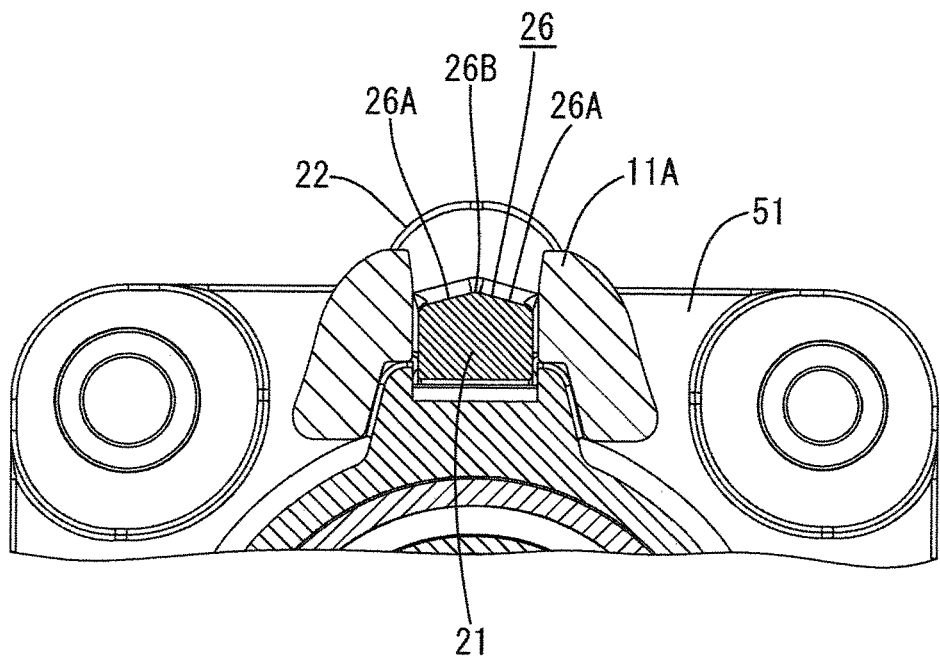
FIG. 9 is a sectional view taken along the line IX-IX of FIG. 2.
Figure 10:
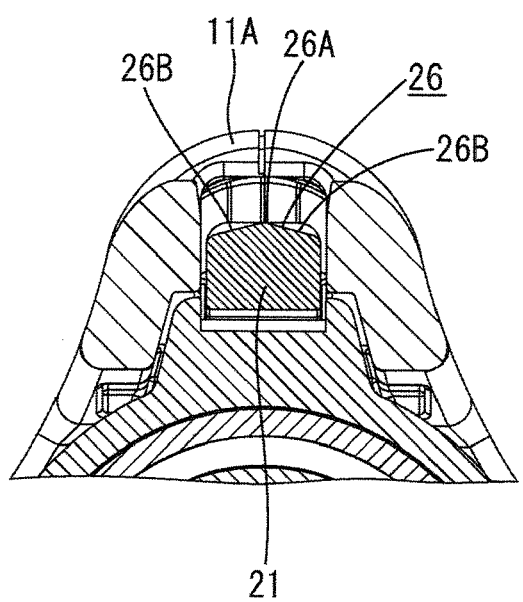
FIG. 10 is a sectional view taken along the line X-X of FIG. 2.

As shown in FIGS. 7 and 8, a portion of the connector main body 11, along which the lever 20 is arranged, is bulged upward, and a front end portion of the bulged portion serves a protection wall 11A. The protection wall 11A is provided to protrude forward from the other portion of the connector main body 11 such that the front end portion of the lever bar 21 is covered by the protection wall 11A with the lock portion 22 being exposed to the outside. Therefore, when the charging connector 10 is erroneously dropped, the lever bar 21 can be prevented from being damaged.

The lock portion 22 includes a head 22A protruding upward from a horizontal portion of the front end portion of the lever bar 21 and a locking protrusion 22B protruding downward from the horizontal portion of the front end portion of the lever bar 21. The locking protrusion 22B is in an overhung manner such that the locking protrusion 22B extends rearward as it extends downward. In accordance with this configuration of the locking protrusion 22B, a lock receiving protrusion 52 of the vehicle side connector 50, with which the locking protrusion 22B engages, is formed in a corresponding overhung manner, as shown in FIG. 4. Therefore, when the connectors 10, 50 are pulled in a disconnecting direction while the locking protrusion 22B and the lock receiving protrusion 52 are engaged with each other, the engagement of the locking protrusion 22B and the lock receiving protrusion 52 cannot be released. The lock receiving protrusion 52 is reinforced by covering its surface by a metal plate. The lock receiving protrusion 52 is an example of a lock receiving portion, and the lock receiving portion may not necessarily be in a form of a protrusion as long as the locking protrusion 22B is engageable with the lock receiving portion.

Figure 18:
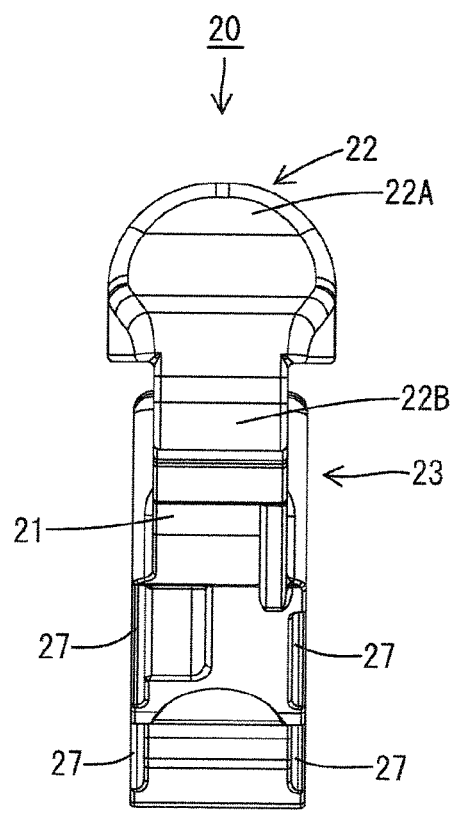
FIG. 18 is a front view of the lever.

As shown in FIG. 18, the head 22A is formed to become wider as it extends upward. This it to ensure the strength that can withstand an impact when the charging connector 10 is erroneously dropped and the head 22A directly hits the ground.

Figure 2:
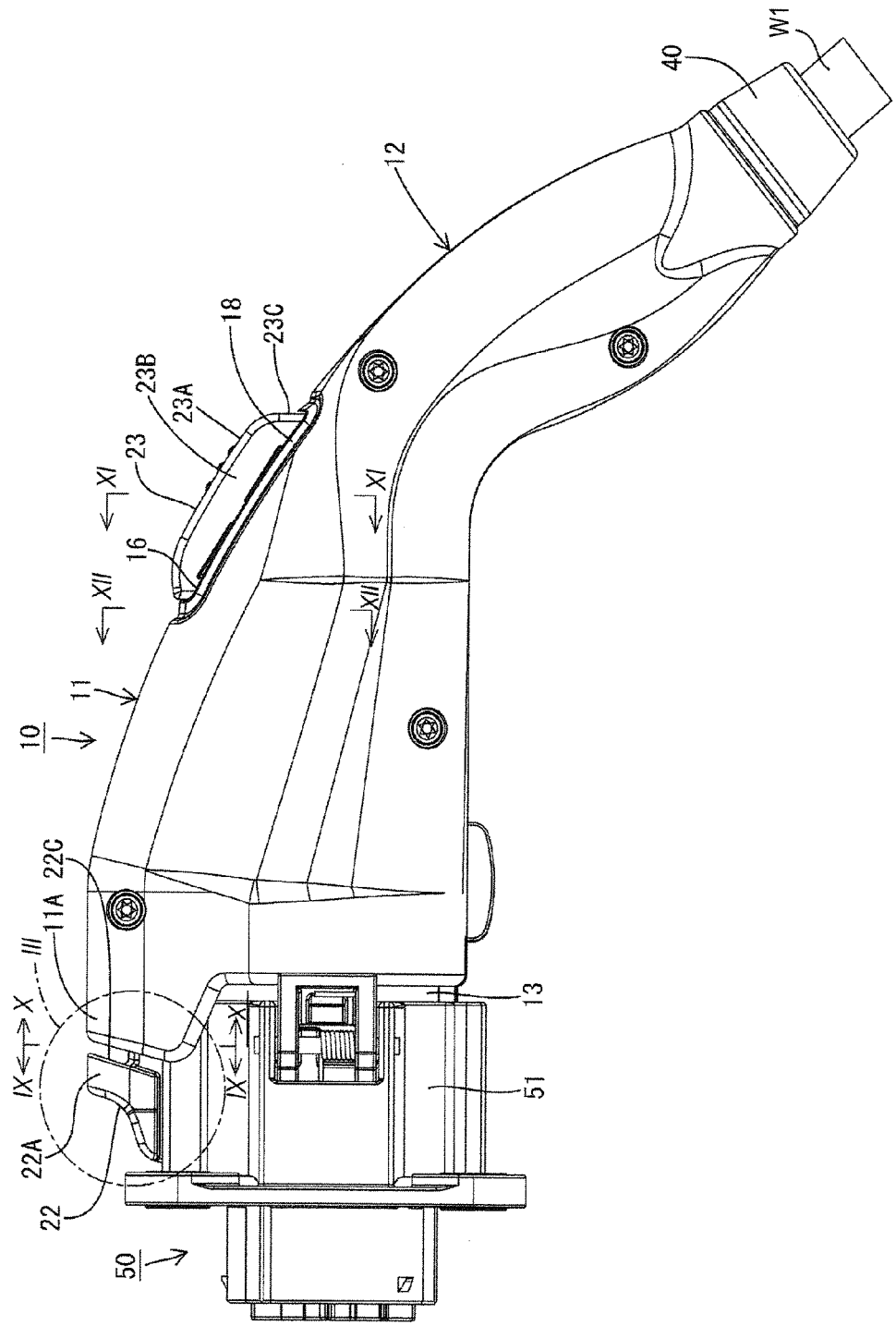
FIG. 2 is a side view of the charging connector coupled to a vehicle-side connector.
Figure 3:
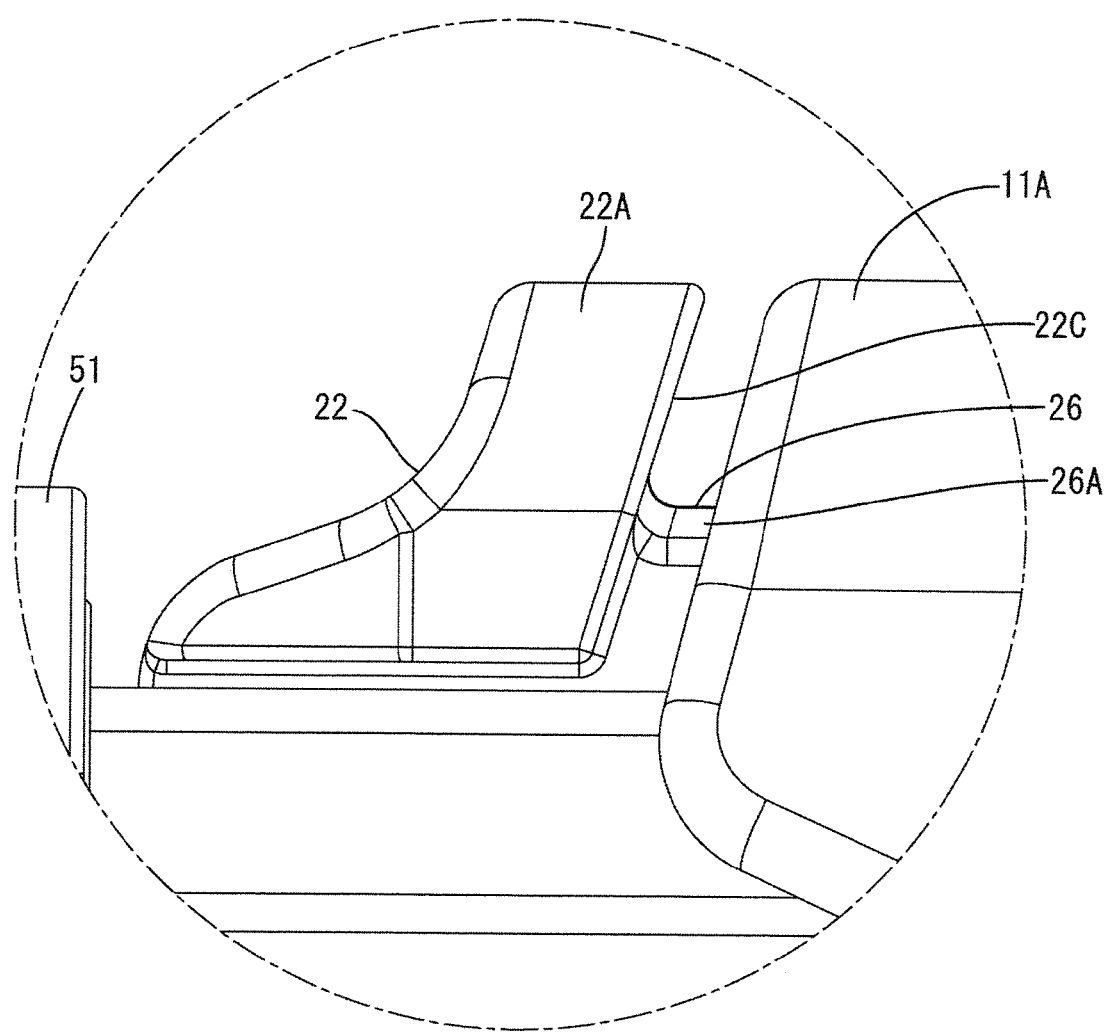
FIG. 3 is an enlarged view of a portion III of FIG. 2.

As shown in FIG. 16, a rear surface 22C of the head 22A is arranged to face the housing, and is formed in a overhung manner such that the rear surface 22C extends rearward as extends upward. As shown in FIG. 2, the lock portion 22 is disposed outside the front opening of the connector main body 11, in front of the protection wall 11A. When the connectors 10, 50 are coupled to each other, a front end of the upper portion of the connector main body 11 (i.e., the front end of the protection wall 11A) is disposed almost parallel to the rear surface 22C of the head 22A, and the top surface of the connector main body 11 is disposed substantially on the same plane as the top surface of the head 22A.

When the charging connector 10 is coupled to the vehicle-side connector 50 in an obliquely downward orientation, the rear surface 22C of the lock portion 22 extends in the vertical direction. Therefore, it is possible to prevent water from remaining and freezing in a space between the rear surface 22C of the lock portion 22 and the protection wall 11A.

As shown in FIGS. 7 and 8, the vehicle-side connector 50 is attached to a vehicle body in a slightly upward orientation. Accordingly, when the charging connector 10 is coupled to the vehicle-side connector 50, the charging connector 10 oriented slightly downward. Therefore, the rear surface 22C of the head 22A is arranged to extend substantially in the vertical direction when the charging connector 10 is coupled to the vehicle-side connector 50. In other words, the rear surface 22C of the head 22A is arranged to extend upward in a direction away from the vehicle-side connector 50 with respect a plane perpendicular to the coupling direction of the connectors 10, 50.

For example, when charging the vehicle battery, snow on the head 22A may melt and the resulting water may enter between the rear surface 22C of the head 22A and the protection wall 11A. However, because the rear surface 22C of the head 22A vertically extends when the charging connector 10 is coupled to the vehicle-side connector 50, the water does no remain on the rear surface 22C of the head 22A, and is prevented from being frozen between the rear surface 22C of the head 22A and the protection wall 11A, thereby avoiding a situation in which the lock portion 22 cannot be released from the lock receiving protrusion 52.

Figure 17:
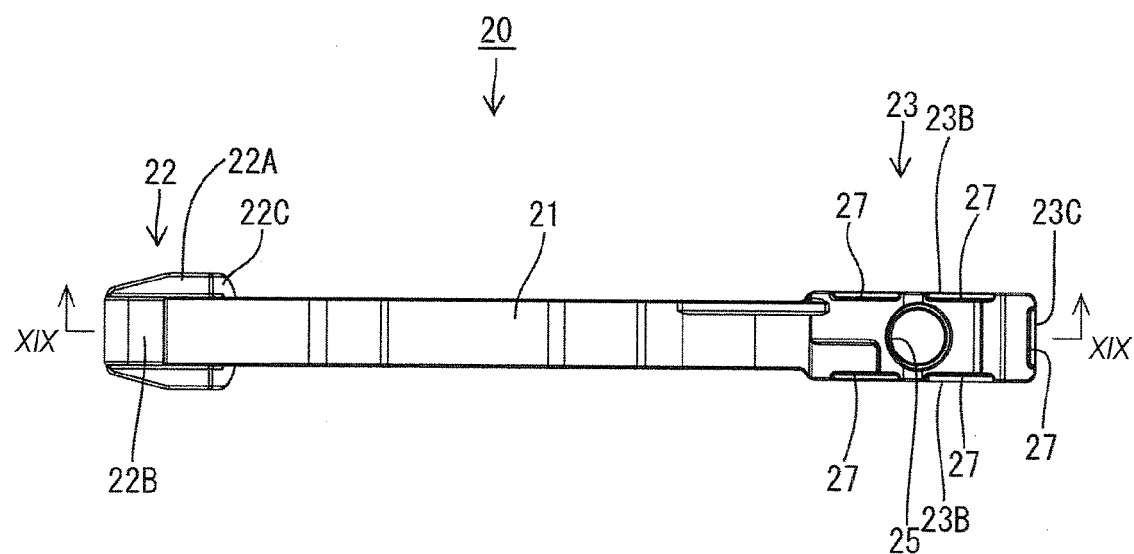
FIG. 17 is a bottom view of the lever.
Figure 19:
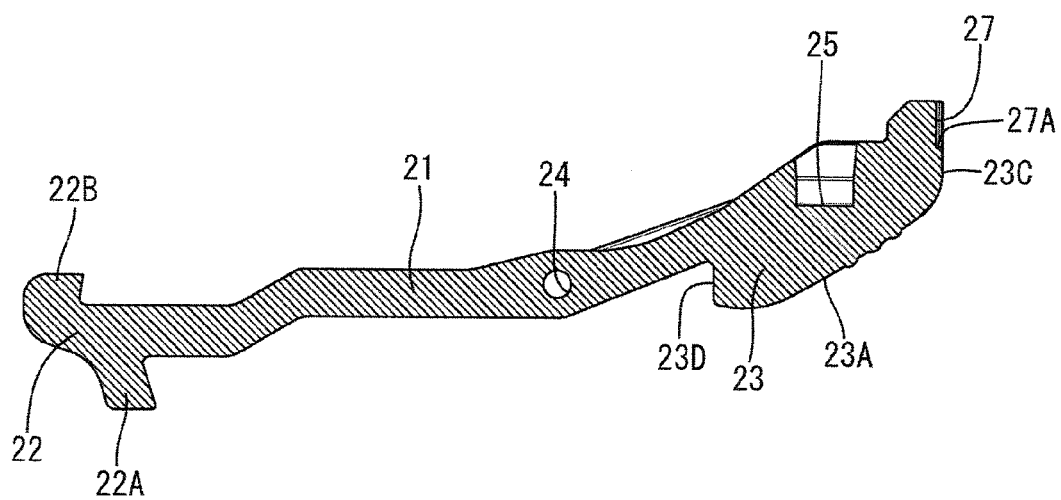
FIG. 19 is a sectional view taken along the line XIX-XIX of FIG. 17.

As shown in FIGS. 1 and 2, the unlock operation portion 23 is arranged to protrude out from an opening 16 formed though a rear portion of the upper wall of the connector main body 11. As shown in FIG. 16, the unlock operation portion 23 is formed to protrude upward from the rear end of the lever bar 21. The unlock operation portion 23 has a pressing surface 23A extending obliquely downward, a pair of side surfaces 23B extending downward from respective lateral sides of the pressing surface 23A, and a rear surface 23C extending downward from a rear side of the pressing surface 23A. As shown in FIGS. 17 and 19, the unlock operation portion 23 further has a spring receiving section 25 formed in the bottom of the unlock operation portion 23 to receive an upper end of a coil spring 60.

Figure 6:
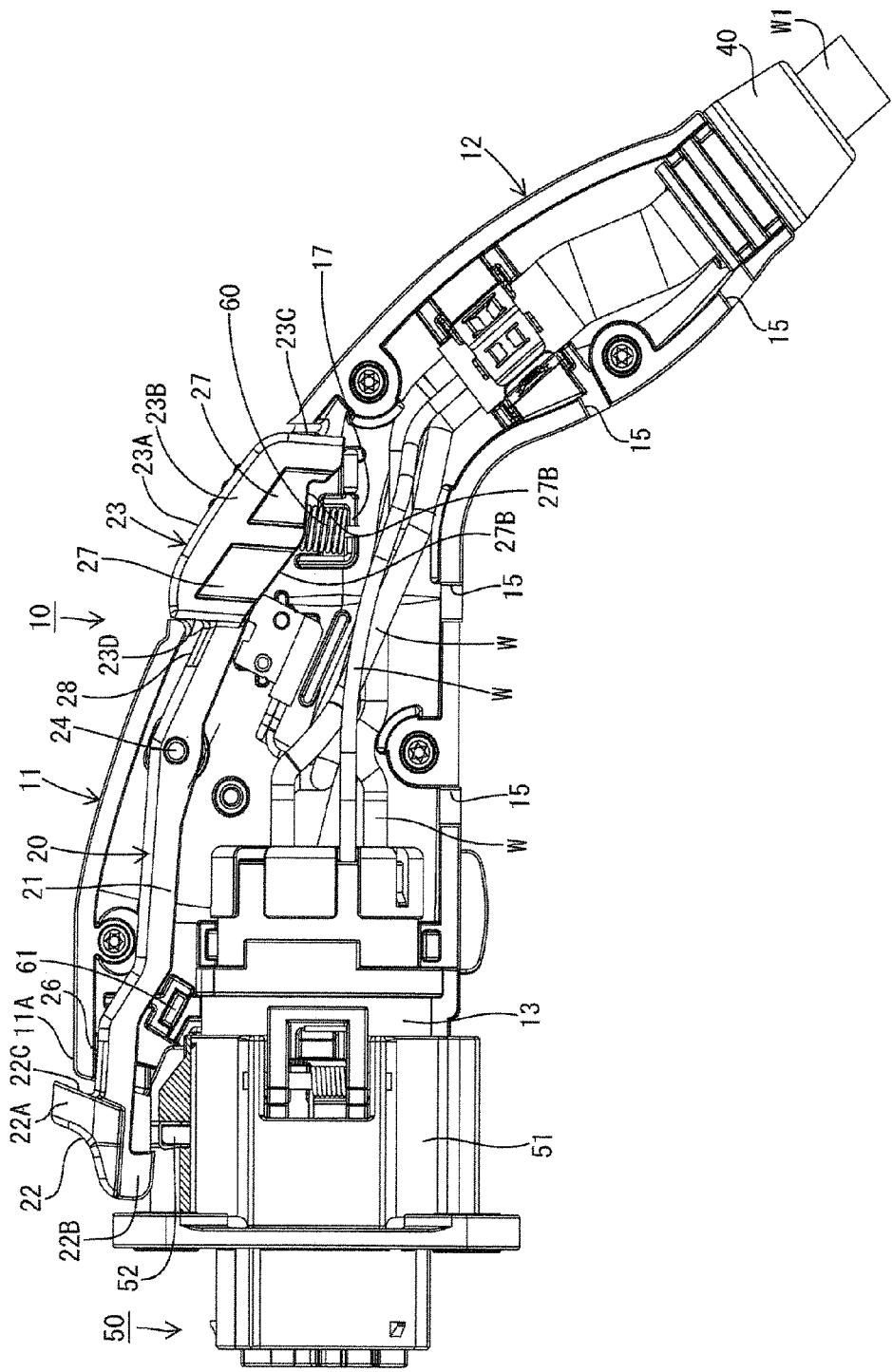
FIG. 6 is a partial sectional view of FIG. 5, illustrating the internal structure of the charging connector.

As shown in FIG. 4, at a portion of the connector main body 11 vertically facing the spring receiving section 25, a spring mounting base 17 is provided to support a lower end of the coil spring 60. The coil spring 60 is mounted between the spring receiving section 25 and the spring mounting base 17 in a compressed manner such that the coil spring 60 pushes the rear end of the lever bar 21 upward to keep the lock portion 22 in a locking position shown in FIG. 4. When the unlock operation portion 23 is pressed down, the lock portion 22 is lifted up so as to be displaced in a release position shown in FIG. 6.

As shown in FIG. 4, when the lock portion 22 is in the locking position, the lever bar 21 of the lever 20 is in contact with an impact absorbing pad 61 provided above the coupling portion 13 inside the connector main body 11. That is, when the unlock operation portion 23 is released when the lock portion 22 is in the release position, the lock portion 22 moves from the release position to the locking position by the spring force of the coil spring 60, and when the lever bar 21 hits the impact absorbing pad 61, the impact is absorbed and the movement of the lock portion 22 is stopped at the locking position.

When the charging connector 10 is coupled to the vehicle-side connector 50 to charge the vehicle battery outdoors, rainwater or snow may fall on the charging connector 10 and, particularly in a cold region, water attached to the lock portion 22 or the unlock operation portion 23 may freeze and obstruct the unlock operation.

For example, near the lock portion 22, water may fall on the upper surface of the lever bar 21 through the space between the rear surface 22C of the head 22A and the front surface of the protection wall 11A. If the water forms into ice on the upper surface of the lever bar 21, the ice may interfere with the inner wall of the protection wall 11A and prevent the lock portion 22 from moving from the locking position to the release position.

Figure 20:
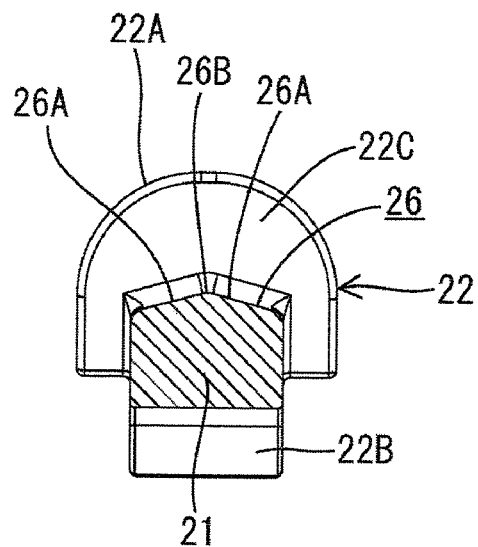
FIG. 20 is a sectional view taken along the line XX-XX of FIG. 16.

In view of this, as shown in FIGS. 16 and 20, a water guide 26 is provided on the front end portion (the end portion adjacent to the lock portion 22) of the upper surface of the lever bar 21, so that the water falling on the water guide 26 runs down toward a region below the lever bar 21. The water guide 26 has a pair of flat slope surfaces 26A. The slope surfaces 26A have a downward inclination extending obliquely downward from a vertex 26B at the center in the width direction of the water guide 26, and are disposed in a bilaterally symmetric manner. Because the slope surfaces 26A are flat, it is possible to smoothly guide and remove the water downward.

As for the unlock operation portion 23, for example, water may enter a gap between the side surfaces 23B and a circumferential edge of the opening 16 that faces the side surfaces 23B, and the water may remain in the gap between the side surfaces 23B and the circumferential edge of the opening 16 due to its surface tension. If the water between the side surfaces 23B and the circumferential edge of the opening 16 freezes, the resulting ice prevents the unlock operation portion 23 from being pressed down. This may also occur in a gap between a front surface 23D of the unlock operation portion 23 the circumferential edge of the opening 16 or in a gap between the rear surface 23C and the circumferential edge of the opening 16.

In view of this, as shown in FIGS. 14 and 16, a plurality of recesses 27 are formed on the side surfaces 23B of the unlock operation portion 23. The recesses 27 are provided to face the circumferential edge of the opening 16. When the lock portion 22 is in the locking position, upper edges 27A of the recesses 27 are above the circumferential edge of the opening 16. The distance from the recesses 27 to the circumferential edge of the opening 16 is longer than the distance from the other portions of the side surfaces 23B to the circumferential edge of the opening 16. Thus, the influence of the surface tension is reduced at the recesses 27. Therefore, the water smoothly runs down through the recesses 27, so that water is prevented from being frozen in the recesses 27 and from interfering with the unlock operation. Similarly, a recess 27 is formed on the rear surface 23C.

On each of the side surfaces 23B, the recesses 27 are arranged in the front-rear direction in a pair. Step surfaces substantially perpendicular to the side surface 23B form peripheral edges of each of the recesses 27. The front edge and the rear edge of the recess 27 extend vertically, parallel to each another. The upper edge 27A of the recess 27 extend obliquely downward toward the rear surface 23C, substantially parallel to the pressing surface 23A of the unlock operation portion 23. Peripheral edges of the recess 27 on the rear surface 23C are likewise formed by step surfaces that are substantially perpendicular to the rear surface 23C.

Figure 11:
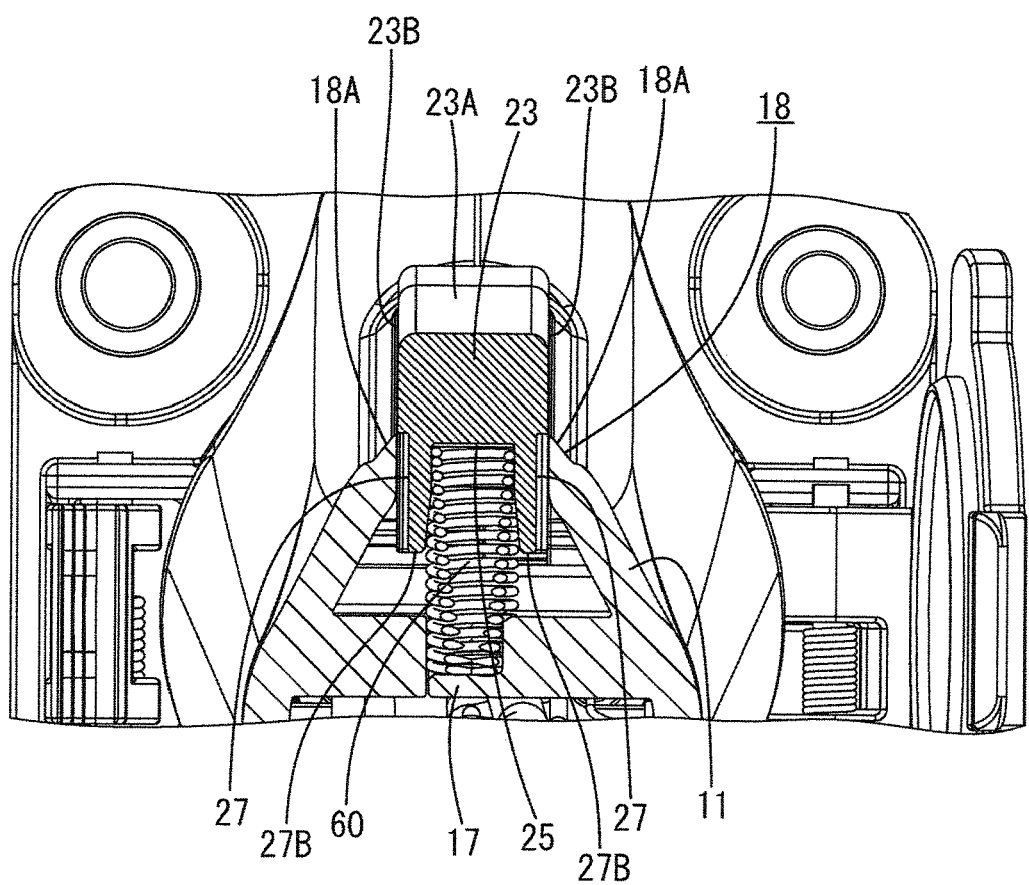
FIG. 11 is a sectional view taken along the line XI-XI of FIG. 2.
Figure 13:
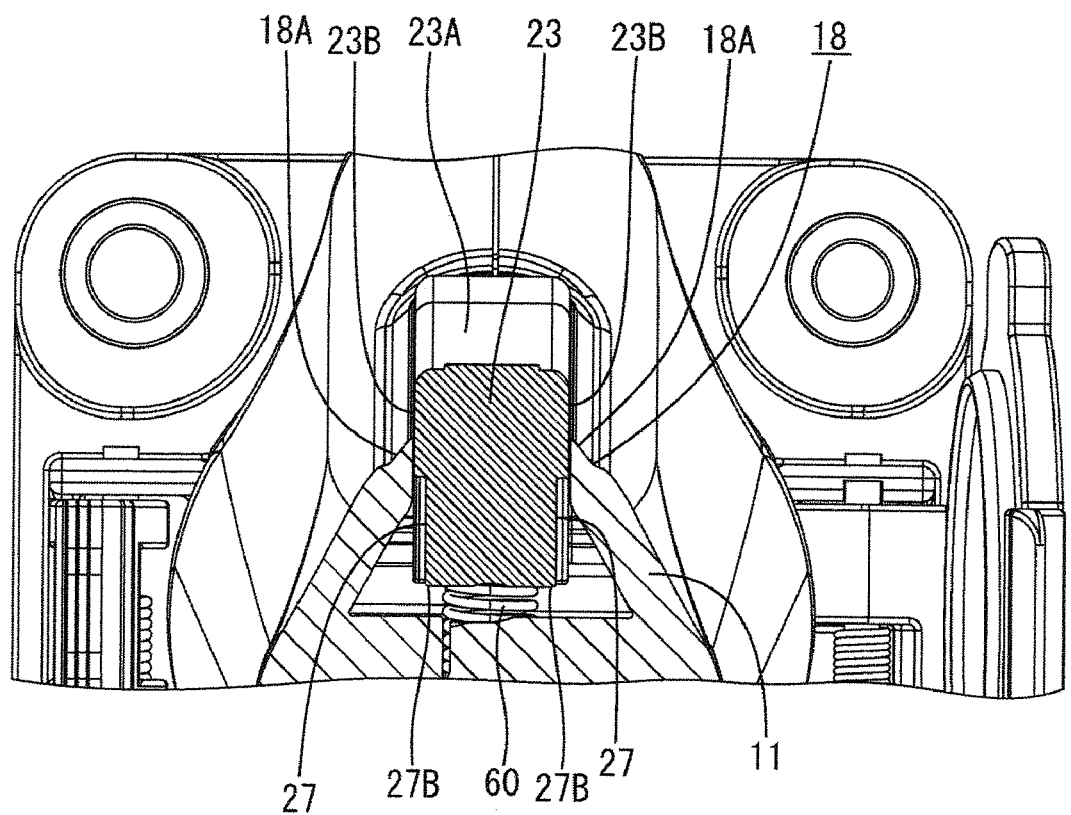
FIG. 13 is a sectional view taken along the line XIII-XIII of FIG. 5.
Figure 21:
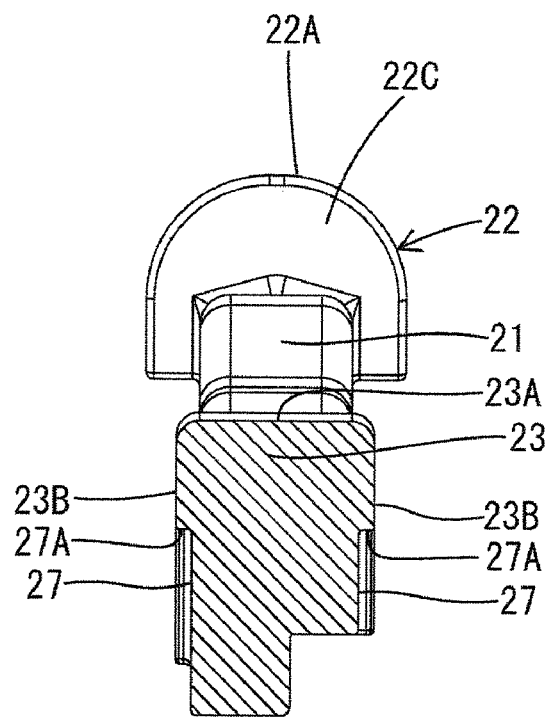
FIG. 21 is a sectional view taken along the line XXI-XXI of FIG. 16.
Figure 22:
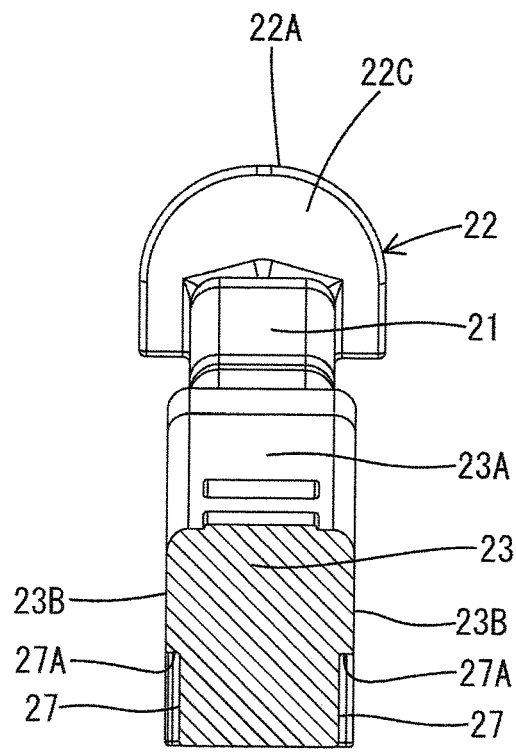
FIG. 22 is a sectional view taken along the line XXII-XXII of FIG. 16.

As shown in FIGS. 19, 21 and 22, because the upper edges 27A of the recesses 27 are formed by step surfaces, even when a small amount of ice is formed between the recesses 27 and the circumferential edge of the opening 16, the ice can be fractured by shearing. That is, when the unlock operation portion 23 is pressed, the upper edges 27A of the recesses 27 enter the opening 16 as shown in FIGS. 11 and 13, such that the upper edges 27A of the recesses 27 and the circumferential edge of the opening 16 serve as shearing edges. Therefore, even when ice is formed in the recesses 27, the ice can be easily fractured by the upper edges 27A of the recesses 27.

A recess is not formed on the front surface 23D of the unlock operation portion 23. This is because, as shown in FIG. 16, the lever bar 21 and the front surface 23D of the unlock operation portion 23 are arranged to face each other in a V-shaped manner, which would require a slide mold to form a recess in the front surface 23D of the unlock operation portion 23, making a mold complex and increasing molding cost. Accordingly, the front surface 23D of the unlock operation portion 23 and the circumferential edge of the opening 16 are arranged such that the water entering a gap between the front surface 23D of the unlock operation portion 23 and the circumferential edge of the opening 16 runs though the gap and falls on the upper surface of the lever bar 21. That is, the gap between the front surface 23D of the unlock operation portion 23 and the circumferential edge of the opening 16 is set so that the surface tension is sufficiently small to allow the water to pass through.

Figure 12:
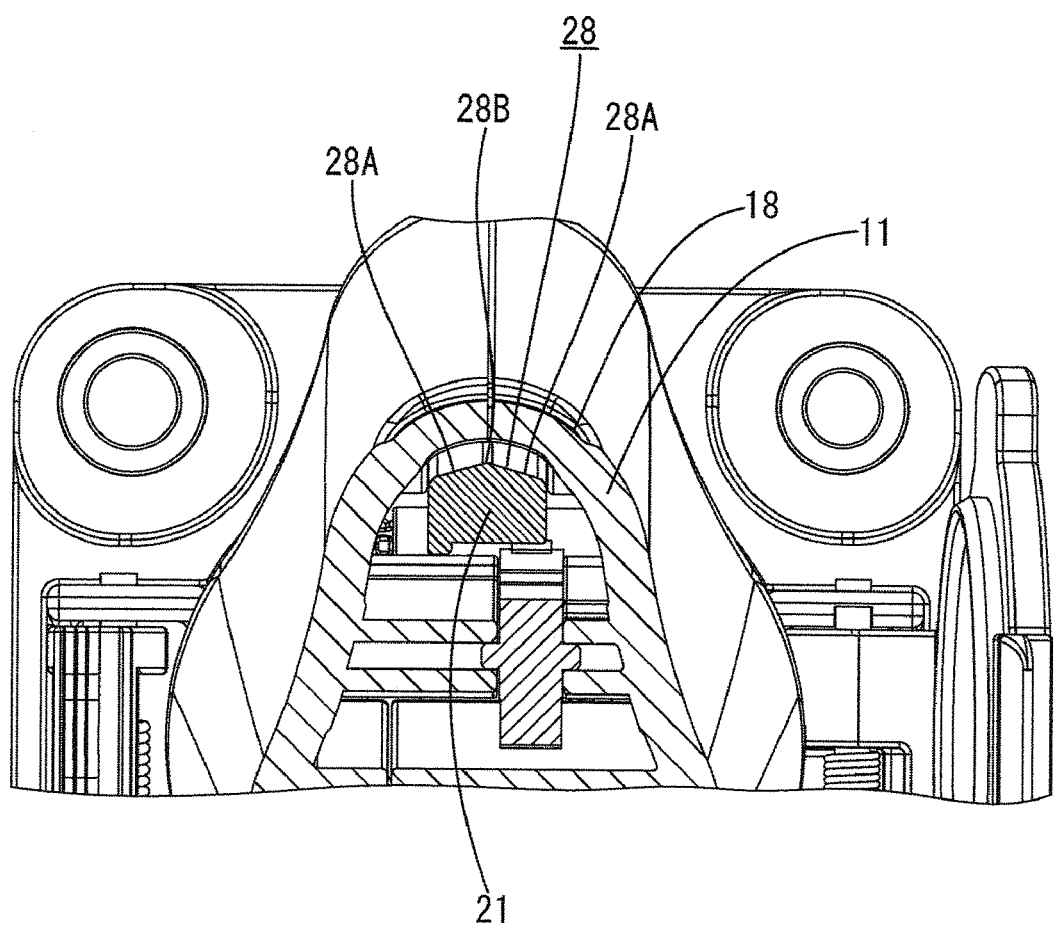
FIG. 12 is a sectional view taken along the line XII-XII of FIG. 2.
Figure 23:
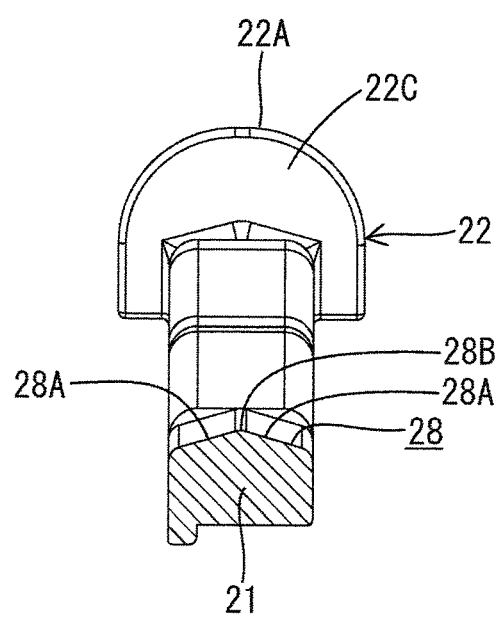
FIG. 23 is a sectional view taken along the line XXIII-XXIII of FIG. 16.

However, if the water falling on the upper surface of the lever bar 21 freezes, the ice formed on the upper surface of the lever bar 21 interfere with the inner wall of the connector main body 11 and obstructs the unlock operation. Therefore, a water guide 28 is provided on an upper surface of an end portion of the lever bar 21 adjacent to the unlock operation portion 23. The water guide 28 a similar configuration as the water guide 26, and has a pair of slope surfaces 28A. That is, as shown in FIG. 23, the slope surfaces 28A have a downward inclination extending obliquely downward from a vertex 28B at the center in the width direction of the water guide 28, and are disposed in a bilaterally symmetric manner. Therefore, as shown in FIG. 12, the water falling on the water guide 28 runs down and is smoothly removed toward a region below the lever bar 21.

Further, as shown in FIGS. 8, 11 and 13, a water catching wall 18 is formed around the circumferential edge of the opening 16. The water catching wall 18 has an inclined surface 18A extending downward from the side surfaces 23B of the unlock operation portion 23. The inclined surface 18A is steeply inclined. The water catching wall 18 is provided around the entire periphery of the opening 16. When the water is attached to the side surfaces 23B of the unlock operation portion 23, the water is directed toward the water catching wall 18 by the inclined surface 18A. Therefore, it is possible to reduce the water entering the gap between the unlock operation portion 23 and the circumferential edge of the opening 16.

Hereinafter, operations and advantages of the configuration described above will be described. First, in the initial stage of coupling the connectors 10, 50, the lock portion 22 moves onto the lock receiving protrusion 52 and the lever 20 is tilted accordingly. When the connector 10 is further pushed toward the connector 50, as shown in FIG. 4, the connectors 10, 50 are completely coupled to each other, and at the same time, the lock portion 22 that has moved over the lock receiving protrusion 52 returns elastically and engages with the lock receiving protrusion 52 in the coupled direction. In this way, the coupled condition of the connectors 10, 50 is locked. A battery is charged while the connectors 10, 50 are being coupled, and when the charging is finished, the grip 12 is grasped by a user's hand and the pressing surface 23A of the unlock operation portion 23 is pressed by a thumb.

Here, when water enters the gap between the lock portion 22 and the connector main body 11, the water falls on the water guide 26. However, the water runs down along the slope surfaces 26A and is removed to a region below the lever bar 21. Further, when water is attached to the unlock operation portion 23, the water is directed toward the water catching wall 18 by the inclined surface 18A of the water catching wall 18, and runs along the outer circumferential surface of the connector main body 11. Thus, the water is controlled so as not to enter into the connector main body 11 from the opening 16.

The water attached to the unlock operation portion 23 may enter the recesses 27. However, in this case, the water runs down to lower edges 27B of the recesses 27 and falls, so that the water is drained out from the connector main body 11 through the drain holes 15. Even if ice is formed in the recesses 27, the ice is destroyed between the upper edges 27A of the recesses 27 and the circumferential edge of the opening 16 by shearing when pressing the unlock operation portion 23.

Further, water entering the connector main body 11 from the gap between the front surface 23D of the unlock operation portion 23 and the circumferential edge of the opening 16 falls on the water guide 28. However, the water runs down along the slope surfaces 28A and toward the lower side of the lever bar 21. Therefore, it is possible to prevent ice from being formed on the circumferential edge of the opening 16 and from interfering with the unlock operation of the unlock operation portion 23.

As described above, according to the exemplary embodiment of the present invention, the water guide 26 is provided on the upper surface of the end portion of the lever bar 21 adjacent to the lock portion 22. Thus, it is possible to prevent ice from being formed on the upper surface of the lever bar 21 and from interfering with the inner wall of the protection wall 11A. Further, because the water guide 26 includes a pair of slope surfaces 26A, the water can smoothly run down toward the lower side of the lever bar 21 along the two slope surfaces 26A. Furthermore, the rear surface 22C of the lock portion 22 is formed in the overhang form. Thus, it is possible to prevent water from remaining in the gap between the rear surface 22C of the lock portion 22 and the protection wall 11A. Accordingly, it is possible to prevent the unlock operation from being obstructed by ice formation near the lock portion 22.

Further, the recesses 27 are provided in the side surfaces 23B and the rear surface 23C of the unlock operation portion 23. Therefore, water can smoothly run down through the recesses 27. That is, it is possible to prevent water from remaining in a gap between the unlock operation portion 23 and the circumferential edge of the opening 16. Further, water attached to the unlock operation portion 23 is directed toward the water catching wall 18 by the inclined surface 18A. This reduces the likelihood of the water entering the gap between the unlock operation portion 23 and the circumferential edge of the opening 16. Furthermore, water entering a gap between the front surface 23D of the unlock operation portion 23 and the circumferential edge of the opening 16 falls on the water guide 28, but this water runs down along the slope surfaces 28A. Therefore, it is possible to prevent the unlock operation from being obstructed due to the ice formation near the unlock operation portion 23.

The present invention is not limited to the exemplary embodiment described above and, for example, the technical scope of the present invention includes the following exemplary embodiments.

The slope surfaces 26A of the water guide 26 may not be flat, and may be an curved slope surface.

The number of slope surfaces 26A of the water guide 26 is not limited to two, and may be one, or three or more.

The recesses 27 may not be provided on all of the side surfaces 23B and the rear surface 23C of the unlock operation portion 23, and may be provided only on the side surfaces 23B or on the rear surface 23C. Further, the number of recesses 27 on each of the side surfaces 23B is not limited to two. For example, a single recess may be provided over the substantially entire area of the side surface 23B. Alternatively, three or more recesses may be formed on the side surface 23B. In this case, it is advantages to narrow the width of each of a partition walls partitioning the recesses as much as possible.

The water catching wall 18 may not be provided along the entire periphery of the circumferential edge of the opening 16. For example, the water catching wall may be provided only at portions of the circumferential edge of the opening 16 not facing the recesses 27.

The water catching wall 18 may not include the inclined surface 18A. For example, the water catching wall may be surface treated to have high water absorbing property.

A recess may be formed on the front surface 23D of the unlock operation portion 23 when, for example, the front surface 23D and the upper surface of the lever bar 21 is arranged such that the recess can be formed on the front surface 23D without using a slide mold. In this case, the water guide 28 may not be provided.

The inclination angle of the rear surface 22C of the lock portion 22 is not limited to the angle in the exemplary embodiment, and may be suitably set in accordance with an inclination the connectors 10, 50 in a coupled condition.

What is claimed is:

1. A vehicle charging connector configured to be coupled to a vehicle-side connector to charge a vehicle battery via the vehicle-side connector, the vehicle charging connector comprising:
   a housing;
   a coupling portion provided on the housing and configured to be coupled to the vehicle-side connector; and
   a lever, wherein the lever comprises:
   a lever bar accommodated in the housing;
   a lock portion provided on one end of the lever bar and configured to engage with a lock receiving portion of the vehicle-side connector to maintain the coupling portion and the vehicle-side connector in a coupled condition; and an unlock operation portion provided on the other end of the lever bar and operable to release an engagement between the lock portion and the lock receiving portion, wherein an upper surface of the lever bar comprises a water guide adjacent to the lock portion, and wherein the water guide comprises a slope surface having a downward inclination.

2. The vehicle charging connector according to claim 1, wherein the slope surface is flat.

3. The vehicle charging connector according to claim 1, wherein the water guide further comprises a vertex, and the slope surface is provided in a pair on respective sides of the vertex.

4. The vehicle charging connector according to claim 1, wherein the lock portion is arranged to protrude out from a front end opening of the housing, and wherein the lock portion comprises a rear surface facing the housing and extending obliquely upward and rearward from the one end of the lever bar.

5. The vehicle charging connector according to claim 1, wherein a drain hole is formed though a bottom wall of the housing.

6. The vehicle charging connector according to claim 1, wherein the housing comprises an opening through which the unlock operation portion protrudes upward; and a water catching wall provided along an edge of the opening and configured to direct water away from a gap between the unlock operation portion and the edge of the opening.

7. The vehicle charging connector according to claim 6, wherein the water catching wall comprises an inclined surface extending downward from the edge of the opening.

8. The vehicle charging connector according to claim 6, wherein the unlock operation portion comprises:

a pressing surface;

a front surface extending downward from a front side of the pressing surface;

a pair of side surfaces extending downward from lateral sides of the pressing surface;

a rear surface extending downward from a rear side of the pressing surface, wherein at least one of the pair of side surfaces and the rear surface comprises a recess, and an upper edge of the recess extends along the pressing surface and is disposed above the edge of the opening when the lock portion is engaged with the lock receiving portion of the vehicle-side connector.

9. The vehicle charging connector according to claim 8, wherein the upper edge of the recess is disposed below the edge of the opening when the unlock operation portion is operated to release the engagement between the lock portion and the lock receiving portion.

* * * * *